Figure 1:
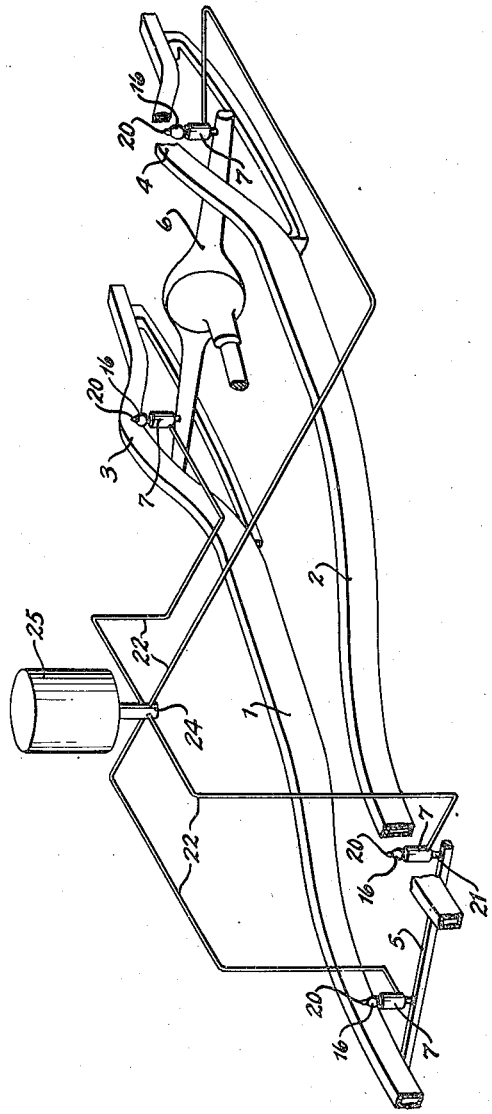

Oct. 26, 1948.　　　　J. M. COSENTINO　　　　2,452,105
SHOCK ABSORBING SYSTEM FOR VEHICLES
Filed Sept. 11, 1946　　　　　　　　　　　　2 Sheets-Sheet 1

Inventor
Joseph Mario Cosentino.

By Clarence A. O'Brien
and Harvey B. Jacobson
Attorneys

Oct. 26, 1948.  J. M. COSENTINO  2,452,105
SHOCK ABSORBING SYSTEM FOR VEHICLES
Filed Sept. 11, 1946  2 Sheets-Sheet 2

Inventor
Joseph Mario Cosentino.

By Clarence A. O'Brien
and Harvey B. Jacobson
Attorneys

Patented Oct. 26, 1948

2,452,105

UNITED STATES PATENT OFFICE 2,452,105

SHOCK ABSORBING SYSTEM FOR VEHICLES

Joseph Mario Cosentino, Baltimore, Md.

Application September 11, 1946, Serial No. 696,306

1 Claim. (Cl. 280—104)

This invention relates to new and improved shock absorbing systems.

An object of the invention is to provide an improved shock absorbing system for vehicles including a hydraulic cylinder and piston mechanism supported between the opposite ends of the front axle and the vehicle chassis, and between the opposite ends of the differential housing and the vehicle chassis, whereby road shocks and impact will be taken up by said hydraulic shock absorbing means and whereby a shock transmitted to any one shock absorber will cause an equalization of pressure through the whole system.

Another object of the invention is to provide an improved shock absorbing system for vehicles including a master cylinder having a piston loosely slidable therein being subjected to air pressure on one side and connected with a set of four hydraulic shock absorbers arranged at the opposite ends of the front axle and differential housing, the same being connected with the other side of the piston in said master cylinder, whereby when any of said shock absorbers are operated to force the pistons contained therein downwardly, the hydraulic fluid below the cylinders will be discharged through suitable connecting pipe lines back into the master cylinder below the piston therein, to act upon and compress the air trapped above said piston and upon a heavy coil spring disposed in the upper end of said master cylinder.

A further object of the invention is to provide an improved shock absorbing system for vehicles comprising a master cylinder and interconnected hydraulic shock absorbing cylinders having pistons slidable therein and protected by rubber dust guards, said shock absorbers being connected between the opposite ends of the front axle and the chassis frame and between the opposite ends of the differential housing and the chassis frame, whereby an impact or shock given any one of the four wheels of the vehicle will be automatically cushioned by operating the nearest shock absorber to force and compress the fluid therein back into the master cylinder.

Another object of the invention is to provide an improved shock absorbing system for vehicles which will include a master cylinder and interconnected hydraulic shock absorbing cylinders having pistons operable therein and coil springs disposed below said pistons, and said master cylinder being provided with a floating piston mechanism together with coil springs positioned at opposite sides of said piston.

A still further object of the invention is to provide an improved shock absorbing system for vehicles which will be highly efficient in operation, and relatively inexpensive to manufacture and produce.

Other objects will appear as the description proceeds.

Figure 2:
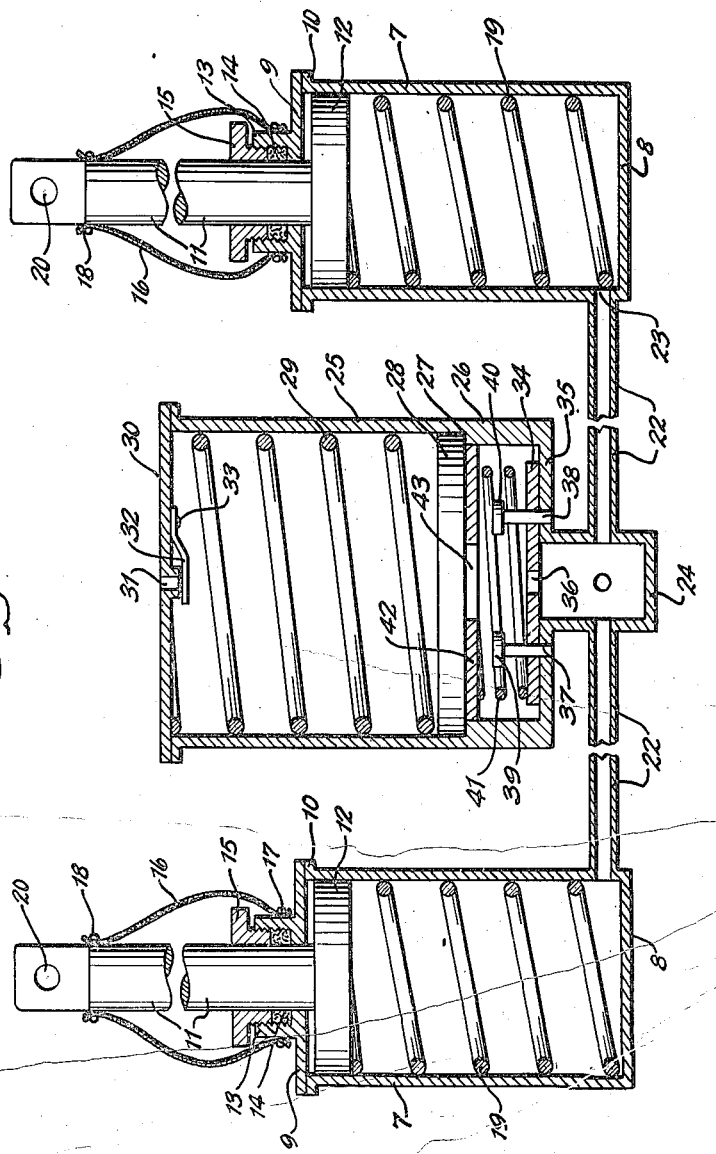

In the accompanying drawings which form a part of this application,

Figure 1 is a perspective view of a vehicle chassis showing the front axle and rear differential housing in position, and with the four hydraulic shock absorbing units connected between the opposite ends of the front axle and the chassis frame and between the opposite ends of the differential housing and the chassis frame, said shock absorbing devices being connected by pipe lines to a centrally located master cylinder for permitting the hydraulic fluid from said shock absorbers to pass up into said cylinder to additionally cushion the effects of shocks, and Figure 2 is a vertical sectional view taken through a pair of shock absorbers and the interconnected master cylinder.

Like characters of reference are used throughout the following specification and the accompanying drawings to designate corresponding parts.

In carrying out the invention, there is provided a vehicle chassis including the longitudinally extending spaced frame members 1 and 2, the same being upwardly curved adjacent their rear ends as at 3 and 4.

A front axle 5 is disposed at the forward end of said frame members to extend transversely thereof, while the differential housing 6 is provided adjacent the rear end of said frame members 1 and 2, to lie in transverse position beneath the upwardly curved portions 3 and 4 of said frame members.

The improved shock absorbing system for vehicles comprises the use of four hydraulic shock absorbers formed identically, each shock absorber comprising a cylinder 7 having a closed bottom 8, and a head 9, suitably secured to an annular flange 10 formed about the upper end of said cylinder 7. The head 9 is centrally apertured to permit the piston rod 11 to extend therethrough, to support the piston 12 on its lower end within said cylinder 7. A concentrically arranged upstanding flange 13 is formed about the central aperture in the head 9, and is internally threaded to receive the packing 14 disposed about said piston rod 11, the same being held firmly in position by means of the externally threaded gland or packing nut 15, which is threaded within the internally threaded flange 13.

A tubular rubber dust guard 16 is disposed about the flange 13 and is secured thereto by means of the spring fastening clips 17, while the upper end of said dust guard extends upwardly to a point adjacent the upper end of said piston rod 11, being secured tightly thereto by means of the spring clip 18, thereby providing a dust free packing between the piston rod and the cylinder.

A heavy coil spring 19 is disposed within the cylinder 7 below the piston 12 to extend substantially the full length of said cylinder, and serves to force the piston 12 to its uppermost position within said cylinder. The upper end of the piston rod 11 is apertured at 20 to provide means for securing the same to the chassis frame, while suitable means 21 are provided on the lower end of the cylinder 7 for attaching the same to the front axle or to the differential housing.

The pipe line 22 is connected with a port 23 formed through the lower side wall of cylinder 7, and is adapted to be connected to a centrally disposed well or collecting chamber 24 formed integrally with the master cylinder 25, said well 24 being open at its upper end and formed to extend below said master cylinder 25 and axially thereof.

The lower portion of the wall of said master cylinder 25 is thickened as at 26, and is formed with the internally disposed annular seat 27 upon which the free floating piston 28 is adapted to seat, being forced downwardly under the resilient action of the heavy coil spring 29 disposed between the head 30 of the cylinder 25 and the upper surface of said piston 28.

A centrally disposed air inlet aperture 31 is formed through the master cylinder head 30 and is controlled by the spring valve arm 32 supported at 33 on the under surface of said head 30, whereby when said piston 28 moves downwardly in the master cylinder 25, air will be drawn through the air inlet 31 by the spring valve 32 into said master cylinder, and when the free floating piston 28 is forced upwardly in said master cylinder 25 against the tension of the coil spring 29, due to one of the four shock absorbers being operated, the air in the upper portion of said master cylinder 25 will be compressed to further cushion the effect of the shock upon the particular shock absorber.

A disk shaped plate valve 34 will be disposed in contact with the bottom 35 of the master cylinder 25, and will be centrally apertured at 36, and will be further guided and supported upon the oppositely disposed upstanding guide rods 37 and 38 secured to said bottom 35 of the master cylinder 25 and extending through suitable apertures in said plate valve 34. Stop heads 39 and 40 will be disposed upon the upper ends of the guide rods 37 and 38 to limit the upward movement of the plate valve 34, and a coil spring 41 will be disposed between the upper surface of the plate valve 34 and the inwardly directed partition 42 adapted to extend flush with the internal annular seat 27, and being provided with enlarged centrally disposed port 43.

It will be understood that the four hydraulic shock absorbers are each formed with a cylinder 7 and will be disposed between the front axle of the vehicle and the chassis frame and between the differential housing and the chassis frame at the rear of the vehicle, and each cylinder will be connected by means of a pipe line 22 with the well or collecting chamber 24 disposed below the master cylinder 25, and that each cylinder 7 will be completely filled with a hydraulic fluid when the pistons 12 therein are in their uppermost position, with the hydraulic fluid completely filling the well 24 and extending upwardly to fill the space in the lower portion of the master cylinder up to the lower surface of the piston 28, when the same is at its lowermost position.

From the foregoing description, it will be seen that when any of the wheels of the vehicle strike a bump, the impact thereof is transmitted through the piston rod and piston in the adjacent hydraulic shock absorber to force the piston downwardly in the shock absorber cylinder, thereby forcing the hydraulic fluid from the cylinder and through the pipe line 22 up through the restricted port 36 in the plate valve 34, to raise said plate valve and to pass about the outer edge thereof to completely fill the compartment in the lower end of the master cylinder 25, and to further pass through the port 43 in the partition 42 to force the free floating piston upwardly in the master cylinder against the action of the coil spring 29, to compress the air trapped in said cylinder, thus completely absorbing the impact of the shock. The action of the several coil springs 29 and 19 located respectively in the master cylinder and in the shock absorbers will force the hydraulic fluid back from the master cylinder into the shock absorbers in position to be again operated.

While the preferred embodiment of the instant invention has been illustrated and described, it will be understood that it is not intended to limit the scope of the invention thereto, as many minor changes in detail of construction may be resorted to without departure from the spirit of the invention.

Thus having described my invention what I claim as new and desire to secure by Letters Patent of the United States is:

In combination with a master cylinder, a plurality of interconnected hydraulic shock absorbing cylinders, pistons in said shock absorbing cylinders, coil springs below said pistons, a free floating piston in said master cylinder, a coil spring compressed between said free floating piston and the head in said master cylinder, an interiorly disposed annular seat for said piston when in its lowermost position, an apertured partition disposed transversely of said master cylinder in horizontal alignment with said seat, an apertured plate valve in the lower end of said master cylinder below said piston, means for limiting the upward movement of said plate valve, and a coil spring disposed between said partition and said plate valve for firmly holding the plate valve in its lowermost position.

JOSEPH MARIO COSENTINO.

REFERENCES CITED

The following references are of record in the file of this patent:

UNITED STATES PATENTS

| Number | Name | Date |
|---|---|---|
| 2,249,402 | Stefano | July 15, 1941 |